United States Patent [19]
Catanzarite

[11] 4,264,688
[45] Apr. 28, 1981

[54] ELECTROCHEMICAL CELL

[76] Inventor: Vincent O. Catanzarite, 7044 Mira Vista, Las Vegas, Nev. 89120

[21] Appl. No.: 66,014

[22] Filed: Aug. 13, 1979

[51] Int. Cl.³ .......................................... H01M 6/00
[52] U.S. Cl. ................... 429/163; 429/178; 429/162; 429/185
[58] Field of Search ............... 429/178, 181, 174, 162, 429/163, 164, 112, 110, 194, 218

[56] References Cited
U.S. PATENT DOCUMENTS

| | | | |
|---|---|---|---|
| 3,416,964 | 12/1968 | Michalko | 429/174 |
| 3,425,872 | 2/1969 | Levy | 429/178 X |
| 3,982,958 | 9/1976 | Newman | 429/57 |
| 3,992,222 | 11/1976 | Walsh et al. | 429/112 X |
| 4,011,371 | 3/1977 | Hallett et al. | 429/174 |
| 4,061,841 | 12/1977 | Sharma | 429/112 |
| 4,105,833 | 8/1978 | Greatbatch et al. | 429/178 X |
| 4,115,692 | 9/1978 | Dey et al. | 429/174 |
| 4,121,020 | 10/1978 | Epstein et al. | 429/162 |
| 4,158,721 | 6/1979 | Decker et al. | 429/174 |

*Primary Examiner*—Anthony Skapars
*Attorney, Agent, or Firm*—Flehr, Hohbach, Test, Albritton & Herbert

[57] ABSTRACT

An electrochemical cell is disclosed herein and includes a casing arrangement which defines a fluid sealed inner compartment and which includes means defining first and second electrically insulated, external terminals. An arrangement of constituents is located within the compartment for producing a voltage drop across the terminals and includes at least one flat electrode and means for attaching the electrode to the terminals.

10 Claims, 5 Drawing Figures

ELECTROCHEMICAL CELL

BACKGROUND OF THE INVENTION

The present invention relates generally to primary batteries.

A typical battery (the term battery and cell are interchangably used) includes an outer casing and electrically insulated terminals which together define a sealed interior chamber. Chemically interacting constituents consisting of a cathode, an anode, and electrolyte are located within the chamber for producing a voltage difference of a characteristic value across the terminals.

In cells having a planar arrangement of cathode and anode (electrodes), a problem arises in reliably attaching the electrodes to the terminals.

Part of the problem stems from the fact that the terminal material is usually different than the electrode material. For example, in lithium batteries, the anode is pure lithium metal. The terminals are usually stainless steel or nickel plated steel. And as is well known, dissimilar metals in the presence of an electrolyte form a galvanic cell and internal self discharge occurs.

In prior art lithium cells, lithium metal was pressed onto a stainless steel screen and the screen was spot welded to a stainless steel terminal pin. This approach has the disadvantage of having a large non-lithium anode surface for galvanic action.

OBJECTS AND SUMMARY

Accordingly, it is an object of this invention to provide an electrochemical cell including an internally located anode and an external terminal which are connected together in an uncomplicated and yet reliable manner.

The electrochemical cell disclosed herein utilized an overall casing arrangement which defines a fluid sealed inner chamber and which includes means defining first and second electrically insulated, external terminals. The cell also includes means located within the chamber and cooperating with the first and second terminal defining means for producing a voltage difference across the terminals. The voltage difference producing means includes an anode, a solid cathode collector and an electrolyte solution. This solution fills the compartment around the anode and solid cathode as well as the other internally located constituents.

One method of attaching the anode to the terminal pin is by piercing the anode with the pin and then bending the pin at 90 degrees. This minimizes surface area, but has the disadvantage of an unreliable contact between the pin and the anode.

An optimum solution is to provide a small clip that provides a highly reiable contact between the pin and the anode, yet is small in surface area so that it avoids internal self discharge.

DETAILED DESCRIPTION AND PREFERRED EMBODIMENTS

Figure 1:
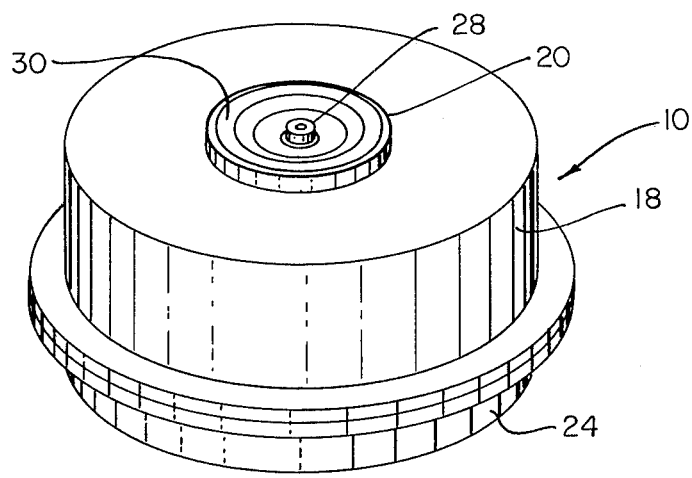
FIG. 1 is a perspective view of an electrochemical cell constructed in accordance with the present invention.

The invention although applicable to most electrochemistries using a planar or flat electrode structure, will be described in connection with a lithium, liquid cathode electrochemistry.

In an effort to improve the electrochemical cell technology, much attention has been given to perfecting what is generally referred to as lithium batteries. This means electrochemical cells using a reactive anode such as lithium in combination with a cathode and electrolyte.

Among all the known combinations of lithium anodes with different cathodes and electrolytes, those believed to have among the highest energy density and current delivery capability use certain inorganic liquids as the active cathode depolarizer. This type of cell chemistry is commonly referred to as liquid cathode.

Liquid cathode cells using oxyhalides are described in U.S. Pat. No. 3,926,699 issued to Auborn on Dec. 16, 1975 and in British Pat. No. 1,409,307 issued to Blomgren, et al. on Oct. 18, 1975. At least one of the oxyhalides, thionyl chloride ($SOCl_2$), in addition to having the general characteristics described above, also provides substantial additional energy density and current delivery capability.

As described in the Auborn and Blomgren patents, the anode is lithium metal or alloys of lithium and the electrolyte solution is an ionically conductive solute dissolved in a solvent that is also an active cathode depolarizer.

The solute may be a simple or double salt which will produce an ionically conductive solution when dissolved in the solvent. Preferred solutes are complexes of inorganic or organic Lewis acids and inorganic ionizable salts. The requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors or electron doublets. In U.S. Pat. No. 3,542,602 it is suggested that the complex or double salt formed between a Lewis acid and an ionizable salt yields an entity which is more stable than either of the components alone.

Typical Lewis acids suitable for use in the present invention includes aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

The double salts formed by a Lewis acid and an inorganic ionizable salt may be used as such or the individual components may be added to the solvent separately to form the salt. One such double salt, for example, is that formed by the combination of aluminum chloride and lithium chloride to yield lithium aluminum tetrachloride.

In addition to an anode, active cathode depolarizer (liquid cathode) and ionically conductive electrolyte, these cells require a current collector or cathode collector. Typical examples of this component are described in the Auborn patent.

Turning now to the drawings, wherein like components are designated by like reference numerals in the various figures, an electrochemical cell constructed in accordance with the present invention is illustrated and generally designated by the reference numeral 10. While the particular cell illustrated is a button battery, it will become apparent hereinafter that all cells including the larger sized cells may incorporate the various features of the present invention to be described with respect to cell 10.

Figure 2:
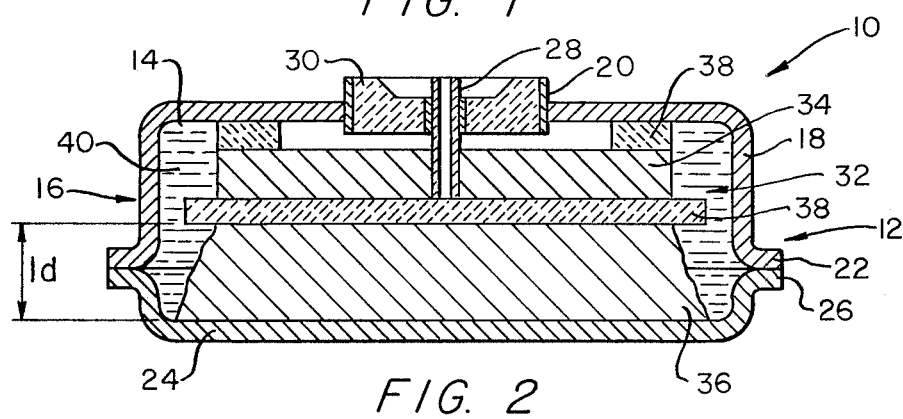
FIG. 2 is an assembled cross sectional view of the cell illustrated in FIG. 1.

Referring to FIGS. 1 and 2, cell 10 is shown to include an overall casing arrangement 12 which defines an internal fluid tight chamber 14. This overall casing arrangement includes a casing 16 which is comprised of a top cover 18 having a central opening 20 extending through its top end and an outwardly flared circumferential flange 22 located at and around its bottom end. The casing also includes a bottom cover 24 having an outwardly flared circumferential flange 26 which is welded or otherwise suitably fastened to the top cover around the underside of flange 22, as best illustrated in FIG. 2. The casing may be of any desired shape and constructed of any suitable material, of course within practical limits and so long as the selection is compatible with the present invention.

In addition to casing 16, the overall casing arrangement 12 includes a pair of electrically insulated terminals, one of which is the casing itself in a preferred embodiment. The other terminal, indicated at 28, is constructed of any suitable electrically conductive material, for example stainless steel, and is elongated in shape. Actually, as will become apparent hereinafter, terminal 28 is utilized to introduce the electrolyte into chamber 14 and, hence, is tubular in a preferred embodiment. This terminal extends through opening 20 and is positioned relative to top cover 18 such that one end of terminal 20 is within chamber 14 and an opposite end outside the casing. It is this opposite end section which acts as the second external terminal of the battery.

To isolate terminal 28 from the casing, overall casing arrangement 12 also includes a circumferential insulation member 30 located within and which fills opening 20 in top cover 18, concentrically around terminal 28, thereby insulating this terminal from the casing. The outer circumferential surface of the insulator is bonded in a continuous fashion to the top cover 18 around opening 20 and its inner circumferential surface is bonded in a continuous fashion to and around the outer surface of terminal 28. The insulator itself may be conventional and it may be conventionally bonded to top cover 18 and terminal 28. However, in a preferred embodiment, the insulator is ceramic.

In addition to overall casing arrangement 12, battery 10 includes an arrangement of chemically interacting components generally designated at 32 in FIG. 2 and which produce the desired voltage difference across the cell terminals, specifically between terminal 28 and casing 16. These components or constituents include an anode 34 and a solid cathode collector 36 which is spaced from and in confronting relation with the anode, both of which will be discussed in detail hereinafter. Suitable electrically nonconductive separators 38, for example, as described in U.S. Pat. No. 3,926,669, are located on opposite sides of anode 34 for insulating the anode from the solid cathode and also from top cover 18.

In addition to these components, the overall voltage difference producing arrangement includes an electrolyte solution, preferably of the type previously described including a solute (salt) and a solvent which also acts as the active cathode depolarizer (liquid cathode), generally designated at 40. This solution is located within and fills chamber 14 and thus is in direct contact with the anode, cathode collector and inner surface of casing 16.

Turning specifically to the constituents making up voltage difference producing arrangement 32, attention is first directed to anode 34. This anode, in a preferred embodiment, is lithium. The lithium is disc shaped, formed from a sheet of lithium metal. The electrolyte is lithium aluminum chloride dissolved in thionyl chloride. The cathode current collector is carbon.

Figure 3:
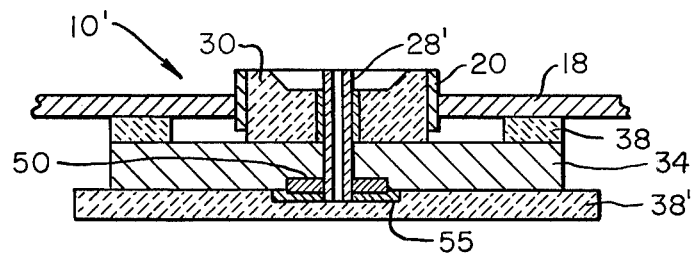
FIG. 3 is a broken away sectional view of one segment of the battery which is constructed in accordance with the present invention.

The prior art technique for attaching an electrical terminal to the active part of the anode is by pressing the anode 34 and the tubular terminal lithium into a nickel screen and welding the screen to the electrode terminal. An improved way of connecting these two components over the prior art is by utilizing the straight terminal 10 which is inserted thorugh the lithium and bent back against the underside thereof. However, this can lead to complete failure of the terminal pin at its bend. In order to eliminate these problems, the anode and terminal are connected together in an entirely different way as illustrated in FIG. 3. In this figure, a portion of an electrochemical cell 10' is illustrated.

As illustrated in FIG. 3, elongated terminal 28' extends through insulator 30 and is adhered thereto in the same manner as previously described for terminal 28. However, terminal 28' includes a substantially straight end segment which extends down into previously described chamber of compartment well beyond the innter surface of the insulator. Anode 34' which is preferably lithium is substantially flat. The downwardly extending end section of terminal 28' extends into the lithium. Means 50 is fixedly connected to and located around that portion of the pin located within the lithium and effectively joins both mechanically and electrically pin 28' to lithium 34'.

Figure 4A:
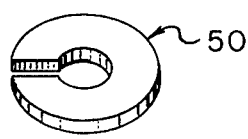
FIGS. 4a and 4b are perspective views of two embodiments of one component used in the battery illustrated in FIG. 3.
Figure 4B:
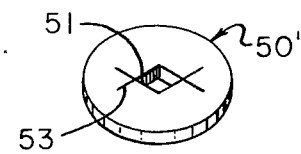

Any suitable means 50 may be provided, of course, taking into account practical limitations such as size and economy. One such means is illustrated in FIG. 4a. As seen in this figure, means 50 is comprised of a slotted metallic washer which is readily fitted tightly around the terminal pin and embedded in and against the underside of anode 34. Another such means is illustrated in FIG. 4b. As seen in this figure, a washer 50' is shown and includes a diamond shaped central opening 51 which includes continuation slits 53 at the opposite points across the opening to provide a degree of flex around the opening.

To prevent internal galvanic currents from shortening the shelf life of the cell, a metal cathodic with respect to the anode cannot be both connected to the anode and in contact with the electrolyte. Since it is likely that means 50 would be cathodic with respect to the anode, care must be taken to preclude means 50 from contacting the electrolyte. This is achieved in the preferred embodiment by completely surrounding means 50 with anode material. This is conveniently accomplished by embedding means 50 partially into the anode and bonding a separate cap-like piece of anode material 55 over means 50 to anode 34. Alternatively, means 50 may be fluid tightly positioned against the underside of the anode and a nonporous, inert insulator material may be fluid tightly positioned over the remainder of means 50.

I claim:

1. An electrochemical cell comprising:
   (a) a casing arrangement which defines an inner compartment and means for defining a first external terminal;
   (b) elongated means for defining a second external terminal, said elongated means including one substantially straight end segment located within said compartment;
   (c) means for electrically insulating said first and second terminals from one another.
   (d) means located within said compartment for producing a voltage difference across said first and second terminals, said voltage difference producing means including a flat anode having a topside and an underside and defining an opening through which at least a portion of said substantially straight end segment of said elongated means extends from said topside and past said underside; and
   (e) means larger than said opening fixedly connected to and located around said portion of said straight end segment, in engagement with the underside of said anode, for preventing said portion from moving up and out of said opening.

2. A cell according to claim 1 wherein said larger means is constructed of metal that is substantially inert in said voltage producing means.

3. A cell according to claim 2 wherein said larger means is at least partially embedded into the underside of said anode.

4. A cell according to claim 1 wherein said anode consists substantially of an active anode material that enters an electrochemical reaction for producing said voltage difference and, in the process thereof, is substantially consumed.

5. A cell according to claim 4 wherein said active anode material is lithium.

6. A cell according to claim 2 wherein said larger means and said elongated means are of the same material.

7. A cell according to claim 3 wherein said larger means is surrounded by anode material by imbedding one side of said larger means into the underside of said anode and positioning a cap of anode material over the other side of said larger means and bonding said cap to said anode.

8. A cell according to claim 1 wherein one side of said larger means is fluid tightly positioned against the underside of said anode and a nonporous insulator is fluid tightly positioned over the remainder of said larger means.

9. A cell according to claim 2 wherein said larger means is at least partially embedded into the underside of said anode.

10. An electrochemical cell comprising:
    (a) a casing arrangement which defines a fluid-tight inner compartment and means for defining a first terminal electrically communicating between the interior and exterior of said compartment;
    (b) elongated means for defining a second terminal electrically communicating between interior and exterior of said compartment, said elongated means including one substantially straight segment located within said compartment;
    (c) means for electrically insulating said first and second terminals from each other;
    (d) means located within said compartment for producing a voltage difference across said first and second terminals, said means including consumable anode having a top side and a bottom side and defining an opening through which a portion of said straight segment of said elongated means extends; and
    (e) means larger than said opening, constructed of a material substantially inert in said voltage producing means, said means connected to and located around said elongated means and in engagement with the underside of said anode for precluding the electrical disengagement of said elongated means and said anode.

* * * * *